Dec. 26, 1967   J. L. METZ   3,359,630
COIL WINDING MACHINE AND METHOD
Filed Sept. 9, 1965
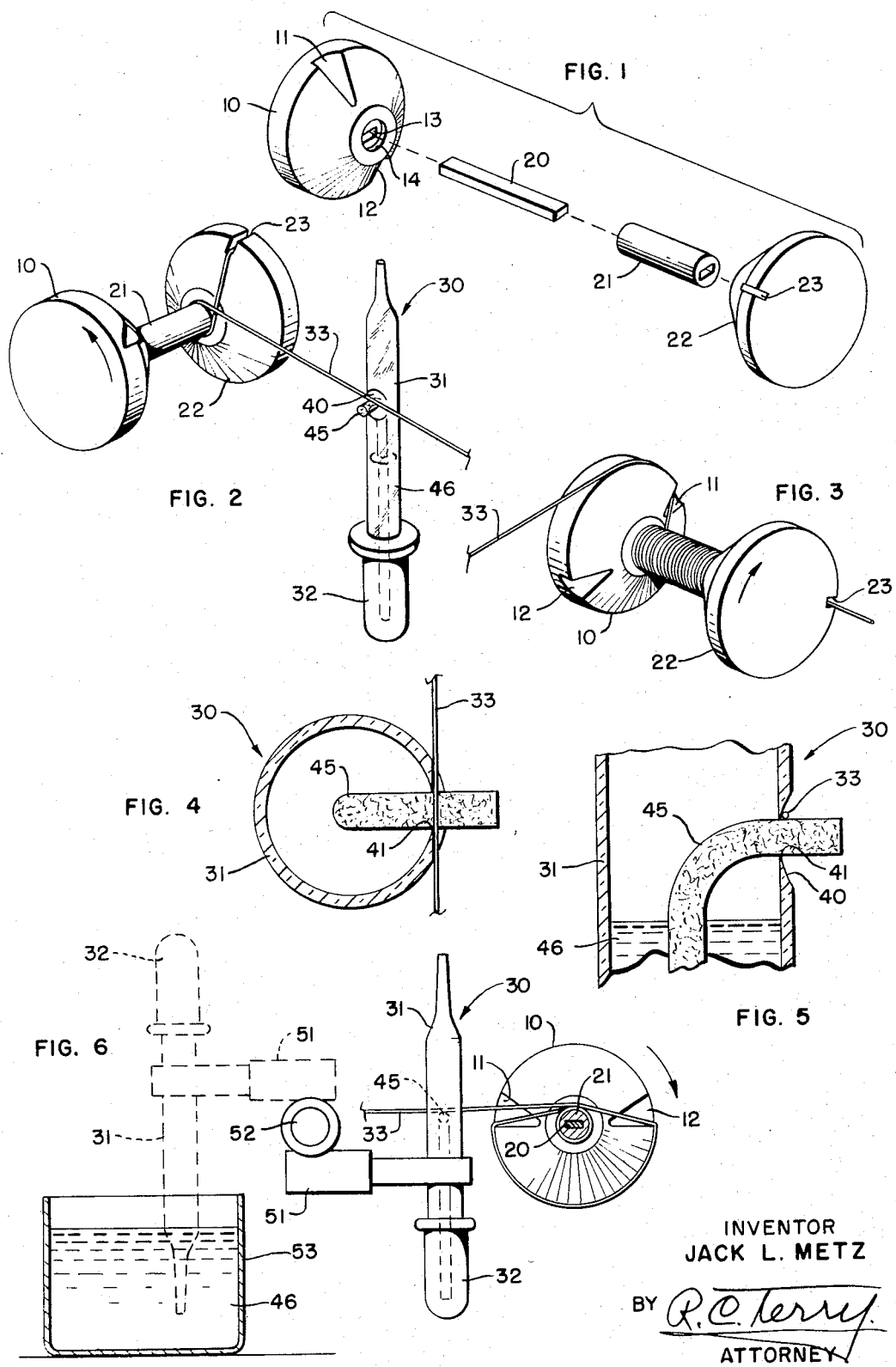
INVENTOR
JACK L. METZ
BY R. C. Terry
ATTORNEY ns of a wind-# United States Patent Office 3,359,630
Patented Dec. 26, 1967

3,359,630
COIL WINDING MACHINE AND METHOD
Jack L. Metz, Des Plaines, Ill., assignor to Teletype Corporation, Skokie, Ill., a corporation of Delaware
Filed Sept. 9, 1965, Ser. No. 486,117
12 Claims. (Cl. 29—605)

This invention relates to coil winding machines and more particularly to machines for winding coils for use in magnetic tape heads.

Due to the nature of magnetic tape heads it is necessary that the coils used therein be of extremely small size (for example, a typical coil is approximately .170″ long x .060″ in diameter) and be formed from very small diameter wire (approximately .0012″ diameter). Additionally, it is frequently desirable to provide a center tap (a connection to some turn of the coil other than the first and the last turns) for such coils. Due to the small size of the coils their manufacture has heretofore been very difficult and expensive, especially when the coils were center tapped.

Accordingly, an object of this invention is to simplify the manufacture of miniature coils.

Another object of this invention is to provide an improved method of manufacturing coils for use in magnetic tape heads.

A further object of this invention is to provide an apparatus which simplifies the winding of center-tapped miniature coils.

According to the preferred embodiment of the invention these and other objects are achieved by forming coils from wire which is coated with insulation and which is also coated with a dormant adhesive. As the wire is guided into the coil winding machine a solvent is applied which activates the adhesive so that as the coil is formed adjacent turns will bond one to the other. The coils are wound upon a flangeless bobbin which is mounted in the coil winding machine adjacent a temporary starting flange and a temporary center-tap flange. When a coil is started the leading end of the wire is placed in a slit in the starting flange and the winding of the coil then proceeds in the usual manner. When a center tap is desired the wire is brought into engagement with the center-tap flange. As the flange is turned the wire enters a notch in the flange and is wound onto the periphery of the flange for a portion of a turn. The wire then engages a second notch in the flange and thereupon re-engages the bobbin, at which time normal winding re-commences. The center-tap flange is formed from a material to which the adhesive on the wire will not adhere so that when the coil is completed it may be removed from the coil winding machine by simply slipping the center tap off of the center-tap flange and then removing the bobbin from the machine while leaving the starting flange and the center-tap flange mounted therein.

A more complete understanding of the invention may be had by referring to the following detailed description when taken in conjunction with the accompanying drawing wherein:

FIG. 1 is an exploded, perspective view showing certain of the parts used in practice of the invention;

FIG. 2 is a perspective view showing certain components of a coil winding machine which embodies the present invention;

FIG. 3 is a perspective view similar to FIG. 2 which shows the center tap step of the invention partially completed;

FIG. 4 is an enlarged sectional view taken along a horizontal plane through the wire guide used in carrying out the invention;

FIG. 5 is a sectional view taken along a vertical plane through the center line of the wire guide, and FIG. 6 is a side view of certain components of a winding machine employing the present invention in which certain parts have been broken away more clearly to illustrate certain features of the invention.

Referring now to the drawing wherein like reference numbers designate like parts throughout the several views, with particular reference being had to FIG. 1, there will be seen a plurality of parts which are preferably mounted on a standard coil winding machine in order to wind coils for use in magnetic tape heads. Although any standard coil winding machine may be used in carrying out the invention it is preferred that the coil winding machine obtainable from Rea Magnet Wire Company of Fort Wayne, Ind. and identified by that company as Model WS4560–4 be used.

In the preferred embodiment a center-tap flange 10 is mounted on the headstock of a coil winding machine for rotation by the motor of the machine. Formed in the center-tap flange 10 are a pair of oppositely facing notches 11 and 12 each of which has a side which is inclined with respect to the axis of the center-tap flange 10 and a second which lies in a plane which includes the axis thereof. Also formed in the center-tap flange 10 is a rectangular mandrel receiving hole 13 and a circular bobbin receiving hole 14.

A mandrel 20 is provided for supporting a flangeless bobbin 21 upon which a coil is to be formed and for transmitting power from the center-tap flange 10 to the bobbin 21 and to a starting flange 22. The mandrel is of rectangular configuration so that power may be transferred from the center-tap flange 10 to the bobbin 21 and to the starting flange 22 without slippage. The bobbin 21 is of cylindrical configuration so that a coil wound thereon will also be of cylindrical configuration. Like the center-tap flange 10 the starting flange 22 has a rectangular mandrel receivng hole and a circular bobbin receiving hole.

The starting flange 22 is normally mounted on the tailstock of a coil winding machine and when so mounted the starting flange 22 is movable axially with respect to the center-tap flange 10 so that the bobbin 21 may be inserted and removed from the coil winding machine. A slit 23 is formed in the starting flange 22 and is suitably dimensioned so that a wire from which a coil is to be formed may be inserted therein and be held against slippage.

In the manufacture of coils for magnetic tape heads the use of extremely fine wire is dictated. In practicing the present invention the use of copper wire of approximately 48 ga. which is coated with an insulating material such as polyurethane and which is also coated with a dormant adhesive that may be activated by an adhesive activating solvent is preferred. Wire of this type is sold by the Rea Magnet Wire company of Fort Wayne, Ind. and is identified by that company as "Koilset" wire.

Referring now to FIGS. 2, 4 and 5 there will be seen a wire guide 30 which is preferably employed in conjunction with the coil winding machine identified hereinbefore in carrying out the present invention. The wire guide 30 is formed from an eyedropper having a shank portion 31 and a bulb portion 32. The shank portion 31 is tubular and is formed from glass or some other ceramic or similar material thereby providing a rigid surface for guiding a wire 33 onto the bobbin 21 while avoiding the problem of wear due to the relative movement of the wire 33 and the guide 30. Formed in the side of the guide 30 is a transverse slot 40. This slot is cut deeply enough into the side of the shank portion 31 of the guide 30 to form a hole 41 therethrough. A wick 45 extends from the bulb 32 of the eyedropper guide 30, through the hole 41 and into the slot 40.

When the guide 30 is mounted in the coil winding machine it is positioned so that the wire 33 travels through the slot 41 and rides on the wick 45 and is thereupon guided into engagement with the bobbin 21 by the shank portion 31 of the eyedropper guide 30. Since the slot 40 extends transversely of the guide 30 a substantially flat surface of a maximum area is presented to the wire and accordingly the abrading effect of the wire on the guide is minimized. At the same time that the wire is being guided in the slot 40 the wick 45 draws an adhesive activating solvent from a quantity of solvent 46 which is contained in the bulb portion 32 of the guide 30 and in the lower part of the shank 31 and applies it to the wire 33 thereby assuring that as the wire is wound upon the bobbin the adhesive which is carried on the wire will be activated. This in turn assures that adjacent turns of the coil formed upon the bobbin will adhere or bond one to the other.

When it is desired to wind a coil the various parts shown in FIG. 1 are assembled by bringing them together along their center line. The mandrel 20 is mounted in the mandrel receiving hole 13 of the center-tap flange 10 and the bobbin 21 is mounted over the mandrel and fitted into the bobbin receiving hole 14 of the flange. The starting flange 22 is then brought into engagement with the mandrel 20 and the bobbin 21. In this position the center-tap flange 10 and the starting flange 22 serve as bobbin heads for the bobbin 21 during the winding operation and, since the bobbin 21 is mounted in the bobbin holes 14, they also provide a predetermined amount of bobbin surface on each end of the bobbin upon which wire will not be wound.

The wire 33 is then threaded through the slot 40 of the eyedropper guide 30 and is engaged with the slot 23 of the starting flange 22 in the manner shown in FIG. 2. The center-tap flange 10, the mandrel 20, the bobbin 21 and the starting flange 22 are then rotated in the direction of the arrow 50 (FIG. 2) while the guide 30 is moved in a distributive pattern relative to the bobbin 21. This causes the wire 33 to be coiled into turns on the bobbin 21 which are spaced superjacent each other in flat spiral arrays. Winding proceeds in the manner of a level winding fishing reel until a predetermined number of turns of wire have been wound upon the bobbin 21. During the winding the wick 45 applies the adhesive activating solvent to the wire 33 so that as the coil is formed the adjacent turns thereof will adhere or bond one to the other. The guide 30 is moved between a position at which the wire 33 is in engagement with the center-tap flange 10 and a position at which the wire 33 is in engagement with the starting flange 22 so that the entire length of the bobbin 21 is covered with turns of wire with the exception of the portions of the bobbin which are inside the bobbin holes 14 of the flanges 10 and 22.

After a predetermined number of turns of wire have been wound onto the bobbin 21 the guide 30 is moved to a position farther to the left (FIGS. 1, 2 and 3) than the leftmost position to which it is moved during the normal winding operation. This urges the wire 33 into engagement with the center-tap flange 10. The center-tap flange 10, the mandrel 20, the bobbin 21 and the starting flange 22 are rotated until the wire 33 enters the notch 11 and engages the surface of the notch 11 which lies in a plane extending through the center line of the flange 10. The center-tap flange 10 and, therefore, the mandrel 20, the bobbin 21 and the flange 22 are rotated further while the positioning of the guide 30 is kept in the extreme left-hand position. This causes the wire 33 to wind onto the periphery of the center-tap flange 10 for a portion of a turn. The winding of the wire 33 onto the flange 10 continues until the wire 33 engages the notch 12 at which time it enters the notch and thereupon re-engages the bobbin 21. The guide 30 is then moved into the leftmost position occupied by it during the normal winding pattern and normal winding of the coil continues until a second predetermined number of turns, which may or may not be equal to the number of turns wound before the center tap was made according to the required characteristics of the coil to be formed, have been wound onto the bobbin 21. As is shown in FIG. 6 the center-tap flange 10 supports the center tap during the second portion of the normal winding operation.

After the desired number of turns are wound onto the bobbin 21 winding operation is stopped and the wire 33 is broken. The activated adhesive on the wire makes it unnecessary to secure the end lead of the wire in any way. The starting lead is removed from the slot 23 and the tailstock of the winding machine, and therefore the starting flange 22, is moved away from the center-tap flange 10, the mandrel 20, and the bobbin 21 thereby allowing removal of the bobbin 21 and the coil wound thereon on the machine.

It should be remembered that all during the winding operation, and particularly during the center tap forming portion thereof, the wick 45 has been applying adhesive activating solvent to the wire 33. Accordingly, the removal of the coil from the coil winding machine would be impossible were it not for the fact that the center-tap flange 10 and the starting flange 22 are formed from a material to which the adhesive which is activated by the adhesive activating solvent will not adhere. Due to this fact the starting lead of the coil slides easily out of the slot 23 of the starting flange 22 when the tailstock is to be moved to its remote position at the end of the winding operaion. Additionally, the center tap which has been formed on the center-tap flange 10 slides easily off of the center tap 10 without disturbing the turns of the coil to which the center tap is attached.

It should be noted that the coil which results from the above described winding operation has a continuous center tap lead and a pair of end leads. This facilitates later identification of the leads which would otherwise be difficult due to the extremely small size of the coils used in magnetic tape heads and further due to the fact that the bobbin 21 is of the flangeless variety.

As is shown in FIG. 6 the guide 30 is supported by a structure 51 which is in turn mounted for pivotal movement on a post 52 into the position shown in dotted lines. In this position the shank 31 of the guide 30 extends into a container of adhesive activating solvent 53 and the quantity of adhesive activating solvent 46 which is normally carried in the bulb portion 32 of the guide 30 and in the lower part of the shank portion 31 may be replenished by merely squeezing the bulb portion 32. The fact that the hole 41 is formed in the side of the shank portion 31 of the eyedropper guide 30 does not hamper the refilling operation extensively since the wick 45 fills the hole 41 to such an extent that little or no air flows into the bulb 32 through the hole 41.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A method of forming center-tapped coils including the steps of:
    applying an adhesive activating substance to a strand which is coated with a dormant adhesive;
    simultaneously guiding the strand in a distributive pattern;
    coiling a length of the strand onto a bobbin in spiral layers while the adhesive is activated so that adjacent turns of the coil will bond one to the other;
    winding at least a portion of a turn onto a center-tap flange which is formed from a material to which the adhesive on the strand will not adhere to form a center tap;
    coiling a second length of the strand onto the bobbin while the adhesive is activated, and
    removing the coil thus formed without disturbing the turns of the coil to which the center tap is connected by slipping the center-tap off of the center tap flange.

2. A method of forming center-tapped coils including the steps of:

applying an adhesive activating substance to a strand which is coated with a dormant adhesive;

simultaneously guiding the strand in a distributive pattern and coiling a length of the strand onto a bobbin in spiral layers so that adjacent turns of the coil will bond one to the other;

winding a second length of the strand onto a center-tap flange which is formed from a material to which the adhesive on the strand will not adhere thereby forming a center tap;

coiling a third length of the strand onto the bobbin while the adhesive is activated; and removing the coil thus formed without breaking the center tap by slipping the center tap off of the center-tap flange.

3. A method of forming center-tapped coils including the steps of:

mounting a bobbin and a center-tap flange adjacent each other on a coil winding machine;

winding a first predetermined number of turns of wire onto the bobbin;

engaging the wire with the center-tap flange;

winding a length of wire onto the center-tap flange;

winding a second predetermined number of turns of wire onto the bobbin;

removing the length of wire from engagement with the center-tap flange, and removing the bobbin from the coil winding machine while leaving the center-tap flange mounted on the coil winding machine.

4. A method of forming center-tapped coils including the steps of:

mounting a bobbin and a center-tap flange adjacent each other in a coil winding machine;

winding a first predetermined number of turns of wire onto the bobbin;

engaging the wire with the center-tap flange and winding at least a portion of a turn of wire thereon;

winding a second predetermined number of turns of wire onto the bobbin;

removing the portion of a turn of wire from engagement with the center-tap flange without breaking said turn and without displacing the turns of wire in the coil to which said portion of a turn is attached; and removing the bobbin from the coil winding machine while leaving the center-tap flange mounted on the coil winding machine.

5. A coil winding machine for winding center-tapped coils on flangeless bobbins including:

a flangeless bobbin about which a wire is to be coiled;

means for guiding a wire onto the bobbin;

means for moving the guiding means and the bobbin with respect to each other so that the wire is coiled onto the bobbin in evenly spaced turns;

means integral with the guiding means for making the surface of the wire adhesive as it leaves the guiding means so that adjacent turns of wire on the bobbin will adhere to one another and so that all of the turns of wire which comprise a completed coil will be joined into a unitary structure; and a center-tap flange for engaging and supporting the wire as a center tap is made and as the remainder of the coil is formed, said flange being formed of a material to which the adhesive on the wire will not adhere so that when the coil is completed the center tap can be slipped off the flange without disturbing the turns of wire to which the center-tap is connected;

said guiding means being movable into a position adjacent the center-tap flange so that the flange will engage the wire and so that the center tap will be wound onto the flange.

6. A coil winding machine for winding center-tapped coils on flangeless bobbins including:

a flangeless bobbin about which a wire is to be coiled;

a hollow ceramic tube for guiding a wire onto the bobbin;

means mounted inside the tube and extending therefrom for making the surface of the wire adhesive as it is guided by the tube so that adjacent turns of wire on the bobbin will adhere to one another and so that all of the turns of wire which comprise a completed coil will be joined into a unitary structure; and a center-tap flange for engaging and supporting the wire as a center-tap is made and as the remainder of the coil is formed, said flange being formed of a material to which the adhesive on the wire will not adhere so that when the coil is completed the center-tap can be slipped off the flange without disturbing the turns of wire to which the center-tap is connected, said tube being movable to a position to cause the flange to engage the wire when it is desired to make a center tap thereby causing the center tap to be wound upon the flange.

7. A coil winding machine for forming wire into center-tapped coils including:

a bobbin upon which the coil is to be wound;

means for guiding the wire in a distributive pattern with respect to the bobbin;

means for rotating the bobbin at a predetermined speed so that the guiding means and the rotating means cooperate to form layers of evenly spaced turns of wire on the bobbin;

a flange having two notches formed in its periphery and mounted adjacent the bobbin for rotation therewith for accepting wire in one of the notches in the flange to cause the wire to wrap partially around the flange, to enter the other notch of the flange and to return to engagement with the bobbin for further winding thereon, thereby forming a center tap, and cooperating means on the bobbin and flange for permitting removal of the bobbin and the completed coil wound upon it from the coil winding machine without removing the flange from the coil winding machine and without breaking the center tap.

8. A coil winding machine for forming wire into center-tapped coils including:

a flangeless bobbin upon which the coil is to be wound;

means for guiding the wire in a distributive pattern with respect to the bobbin;

means for rotating the bobbins at a predetermined speed so that the guiding means and the rotating means cooperate to form layers of evenly spaced turns of wire;

means for bonding adjacent turns on wire one to the other as the wire is coiled onto the bobbin;

a center-tap flange having two notches formed in its periphery and mounted for rotation by the rotating means for accepting wire in one of the notches to cause the wire to wrap partially around the flange, to enter the other notch of the flange and to return to engagement with the bobbin for further winding thereon thereby forming the center tap, and cooperating means on the center-tap flange and the bobbin for allowing removal of the bobbin and the completed coil wound upon it from the coil winding machine without removing the center-tap flange from the coil winding machine and without breaking the center tap.

9. In a machine for forming wire, which has previously been coated with a material that, when activated, becomes an adhesive, into coils in which adjacent turns of wire are bonded together by the activated adhesive;

a wire guide for longitudinal movement with respect to the coils being formed to control the lateral spacing of the turns of the coils and to assure that each turn will be positioned superjacent another turn;

a quantity of adhesive activating liquid stored in the guide; and a wick mounted on the guide for drawing the adhesive activating liquid from the quantity of liquid and for applying it to the wire as it is being guided by the guide so that the wire is covered with an adhesive material as it is formed into a coil.

10. In a machine for forming wire; which has previously been coated with a material that, when activated, becomes an adhesive; into coils in which adjacent turns of wire are bonded together by the activated adhesive;

a wire guide for longitudinal movement with respect to the coils being formed to control the lateral spacing of the turns of the coils and to assure that each turn will be positioned superjacent another turn; and means mounted on the guide for applying an adhesive activating liquid to the wire as it is being guided by the guide so that as the turns of the coil are formed they will simultaneously be bonded together by the adhesive.

11. In a coil winding machine for forming adhesive coated wire into coils in which adjacent turns are bonded one to the other, a wire guide including:

a ceramic cylinder having a wire-guiding slot formed in its side and extending transversely with respect to the axis of the cylinder for guiding a wire into the coil winding machine;

a quantity of adhesive activating liquid for activating the adhesive which is carried on the wire; and means extending from the quantity of liquid into the slot for drawing the adhesive activating liquid from the quantity of liquid and for applying it to the wire as it travels through the slot so that the adhesive will be effective to bond the turns of the coil together as they are formed.

12. In a coil winding machine for forming adhesive coated wire into coils in which adjacent turns are bonded one to the other, a wire guide including:

a hollow, rigid, wear resistant tube having a wire-guiding slot formed in its side and having a hole interconnecting its inner cavity and the slot for guiding a wire into the coil winding machine;

a quantity of adhesive activating liquid contained in the inner cavity of the tube for activating the adhesive which is carried on the wire; and a wick extending from the quantity of liquid, through the hole and into the slot for drawing the adhesive activating liquid from the quantity of liquid and for applying it to the wire as it is guided into the coil winding machine so that nothing disturbs the adhesive from the time it is activated until the time the wire is formed into a coil.

References Cited

UNITED STATES PATENTS

| | | | |
|---|---|---|---|
| 268,198 | 11/1882 | Davis | 242—125 |
| 1,639,145 | 8/1927 | Niemann | 29—605 |
| 2,910,026 | 10/1959 | Ajouelo. | |
| 3,128,798 | 4/1964 | Liebman | 29—605 X |
| 3,141,632 | 7/1964 | Spitz | 242—9 X |
| 3,228,615 | 1/1966 | Lancaster. | |

JOHN F. CAMPBELL, *Primary Examiner.*

C. E. HALL, *Assistant Examiner.*